US008615233B2

(12) United States Patent  (10) Patent No.: US 8,615,233 B2
Skarp  (45) Date of Patent: Dec. 24, 2013

(54) BASE STATION SCANNING USING MULTIPLE RECEIVE PATHS

(75) Inventor: Filip Skarp, Södra Sandby (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/384,504

(22) PCT Filed: Dec. 17, 2010

(86) PCT No.: PCT/EP2010/007756

§ 371 (c)(1),
(2), (4) Date: Jan. 17, 2012

(87) PCT Pub. No.: WO2012/079613

PCT Pub. Date: Jun. 21, 2012

(65) Prior Publication Data

US 2013/0260751 A1  Oct. 3, 2013

(51) Int. Cl.
*H04W 48/16* (2009.01)

(52) U.S. Cl.
USPC ............................ 455/434; 375/267; 455/41.2

(58) Field of Classification Search
USPC ................. 455/434, 78, 41.2, 161.1; 375/267
See application file for complete search history.

(56) References Cited

U.S. PATENT DOCUMENTS

| 2003/0186698 A1 | 10/2003 | Holma et al. |
| 2006/0128308 A1* | 6/2006 | Michael et al. ............. 455/41.2 |
| 2008/0095132 A1 | 4/2008 | Lindoff et al. |
| 2009/0168914 A1* | 7/2009 | Chance et al. ................ 375/267 |

* cited by examiner

*Primary Examiner* — Phuoc H Doan
(74) *Attorney, Agent, or Firm* — Edwards Wildman Palmer LLP; Peter F. Corless; Christine C. O'Day

(57) ABSTRACT

A communication device (100) comprises at least a first receive path (12) and a second receive path (22). The first receive path (12) is configured to receive first radio signals, and the second receive path (22) is configured to receive second radio signals. Further, the communication device (100) comprises a reception processor (50). The reception processor (50) is configured to process the first radio signals and the second radio signals to generate a data output signal (55). Further, the communication device (100) comprises a first oscillator (13) and a second oscillator (23). The first oscillator (13) is configured to supply a first oscillator signal to the first receive path (12). The second oscillator (23) is configured to supply a second oscillator signal to the second receive path (22). Further, the communication device comprises a scanning processor (60) coupled at least to the second receive path (22) and to the second oscillator (23). The scanning processor (60) is configured to scan for radio signals from at least one base station by evaluating the second radio signals received by the second receive path (22) and controlling the second oscillator (23) to provide the second oscillator signal with frequencies which are different from a frequency of the first oscillator signal.

15 Claims, 5 Drawing Sheets

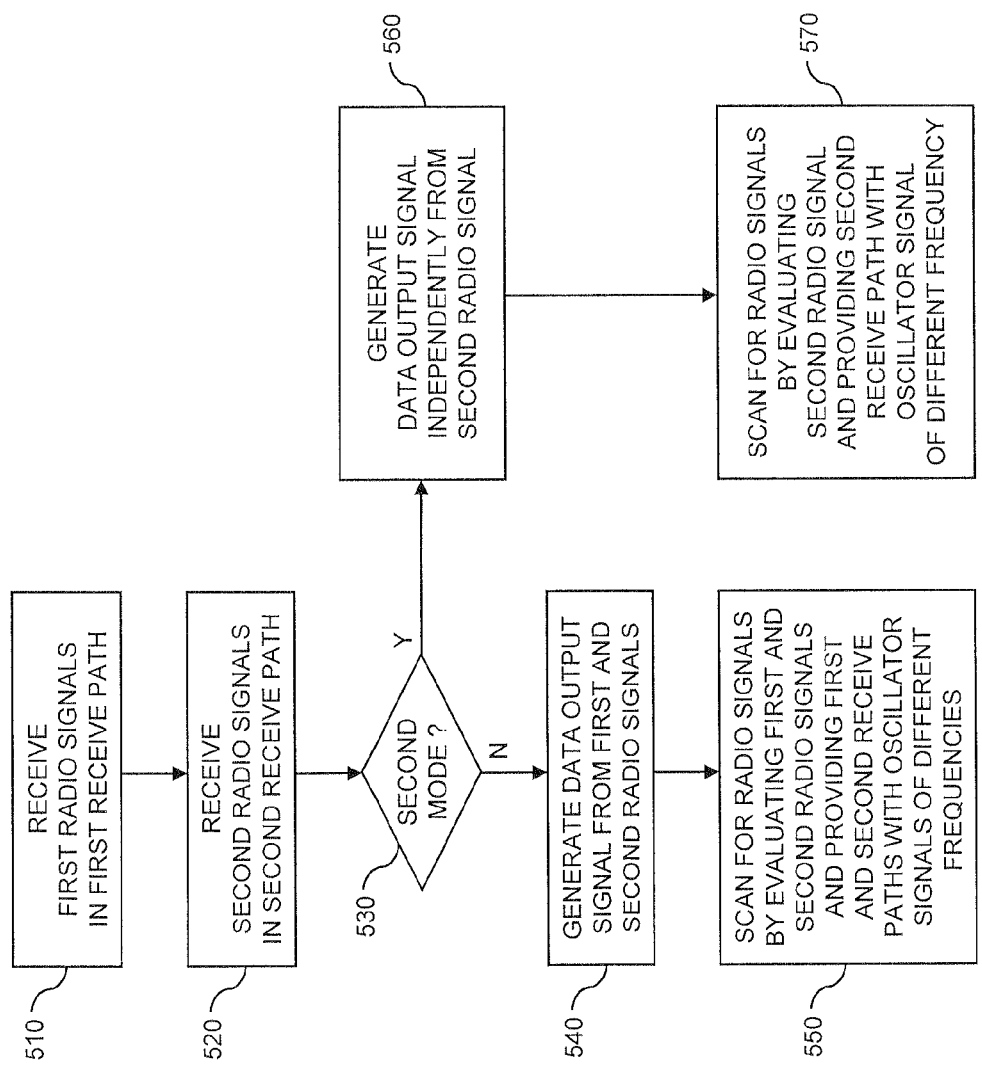

BASE STATION SCANNING USING MULTIPLE RECEIVE PATHS

CROSS-REFERENCES TO RELATED APPLICATIONS

This application is a 35 U.S.C. 0371 U.S. national entry of International Application PCT/EP2010/007756 having an International filing date of Dec. 17, 2010, the entire contents of which is incorporated herein by reference in its entirety.

FIELD OF THE INVENTION

The present application relates to methods of scanning for base stations and to corresponding devices.

BACKGROUND

In radio access technologies, e.g., according to a Third Generation Partnership Project (3GPP) mobile telecommunications standard such as Wideband Code Division Multiple Access (WCDMA) or Universal Terrestrial Telecommunications System (UMTS), or according to a further evolved mobile telecommunications standard such as 3GPP LTE (Long Term Evolution), a mobile communication device, also referred to as user equipment (UE), receiving signals from one base station needs to scan the available radio spectrum for other base stations. In this way, the UE is enabled to identify and select the base station offering the best performance.

The scanning is typically done by listening, at given time intervals, for other base stations in the same frequency band or even in other frequency bands. This needs to be done even during an ongoing data session or voice session, without disturbing the ongoing session. For this purpose, it is known to use a compressed mode for the data transmission to the UE. For example, a compressed mode is described in 3GPP technical specification (TS) 25.212, section 4.4. The compressed mode generates a transmission gap or empty slot in the data signal of the ongoing session, which can then be used for performing measurements on other frequencies.

However, the known implementations of scanning using the compressed mode typically have a negative impact, e.g., on the load in the mobile communication network or on the data throughput. It is therefore desirable to reduce usage of the compressed mode as far as possible.

Accordingly, there is a need for techniques which allow for efficiently implementing processes of scanning for base stations.

SUMMARY

According to an embodiment of the invention, a mobile communication device is provided. The communication device comprises at least a first receive path and a second receive path, e.g., for accomplishing Multiple-Input and Multiple Output (MIMO) reception. The first receive path is configured to receive first radio signals, and the second receive path is configured to receive second radio signals. A first antenna may be coupled to the first receive path, and a second antenna may be coupled to the second receive path. Further, the communication device comprises a reception processor. The reception processor is configured to process the first radio signals and the second radio signals to generate a data output signal, e.g., by applying MIMO processing. Further, the communication device comprises a first oscillator and a second oscillator. The first oscillator is configured to supply a first oscillator signal to the first receive path, e.g., to be used in a demodulator of the first receive path. The second oscillator is configured to supply a second oscillator signal to the second receive path, e.g., to be used in a demodulator of the second receive path. Further, the communication device comprises a scanning processor coupled at least to the second receive path and to the second oscillator. The scanning processor is configured to scan for radio signals from at least one base station by evaluating the second radio signals received by the second receive path and controlling the second oscillator to provide the second oscillator signal with frequencies which are different from a frequency of the first oscillator signal. In this way, the communication device can use the second receive path for scanning independently from the first receive path, which allows for efficiently implementing the scanning process. For example, the first receive path may be used for receiving data from a base station on a certain frequency, while the second receive path is used for scanning different frequencies for the presence of radio signals from other base stations.

According to an embodiment of the invention, the reception processor is provided with a first mode in which the data output signal of the reception processor is generated on the basis of both the first radio signal and the second radio signal. For example, the reception processor may be configured to apply MIMO processing in the first mode to generate the data output signal from the first radio signal and the second radio signal. Further, the reception processor may be provided with a second mode in which the data output signal of the reception processor is generated independently from the second radio signal. For example, the data output signal may be generated from only the first radio signal, e.g., by applying Single-Input and Single-Output (SISO) processing to the first radio signal. Accordingly, in some embodiments the first mode may correspond to a MIMO mode, and the second mode may correspond to a SISO mode. In some embodiments, also the first mode may correspond to a MIMO mode using a first number of receive paths, and the second mode may correspond to a MIMO mode using a second number of receive paths, which is lower than the first number of receive paths.

According to an embodiment of the invention, the scanning processor is configured to accomplish said scanning for radio signals simultaneously with the generation of the data output signal while the reception processor is in the second mode. Accordingly, the second receive path, which is not needed for generating the data output signal in the second mode, may be used for performing the scanning for radio signals.

According to an embodiment of the invention, the scanning processor is further coupled to the first receive path and to the first oscillator, and is configured to scan for radio signals from at least one base station by evaluating both the first and second radio signals and controlling the first oscillator and the second oscillator to provide the first oscillator signal with first frequencies and the second oscillator signal with second frequencies, which are different from the first frequencies. In this embodiment, the first and the second receive path can be used in parallel for independent scanning processes. In this way, scanning can be accomplished in an efficient manner. For example, the first receive path may be used for scanning in a first frequency range, while the second receive path is used for scanning in a second frequency range which is different from the first frequency range.

According to an embodiment of the invention, the scanning processor is configured to accomplish said scanning for radio signals during empty slots of a data transmission via the first and second radio signals. The empty slots may be provided by using a compressed mode for the data transmission via the first and second radio signals. By accomplishing the scanning during empty slots of the data transmission, scanning becomes possible also in the first mode while receiving data via the first and second radio signals.

According to an embodiment of the invention, the communication device comprises a first switch for selectively providing the first oscillator signal to the second receive path and a second switch for selectively providing the second oscillator signal to the second receive path. By means of the first and second switch, the first oscillator signal may be provided to both the first and second receive paths while receiving data in the first mode. In the second mode or during the scanning process, the second oscillator signal may be provided to the second receive path, thereby allowing for the first and second receive paths to be operated on the basis of independent oscillator signals.

According to an embodiment of the invention, a method of receiving data in a mobile communication device is provided. According to the method, first radio signals are received in a first receive path and second radio signals are received in a second receive path. In a first mode, a data output signal is generated on the basis of the received first radio signals and the received second radio signals. In a second mode, generating the data output signal is generated independently from the received second radio signals. In the second mode, scanning for radio signals from at least one base station is performed. This scanning is accomplished by evaluating the received radio signals of the second receive path and providing the second receive path with a second oscillator signal having frequencies which are different from a frequency of a first oscillator signal provided to the first receive path. In this way, the communication device can use the second receive path for scanning independently from the first receive path, which allows for efficiently implementing the scanning process. For example, the first receive path may be used for receiving data from a base station on a certain frequency, while the second receive path is used for scanning different frequencies for the presence of radio signals from other base stations.

According to an embodiment of the invention, MIMO processing may be applied in the first mode to generate the data output signal from the first radio signal and the second radio signal. In the second mode, the data output signal may be generated from only the first radio signal, e.g., by applying SISO processing to the first radio signal. Accordingly, in some embodiments the first mode may correspond to a MIMO mode, and the second mode may correspond to a SISO mode. In some embodiments, also the first mode may correspond to a MIMO mode using a first number of receive paths, and the second mode may correspond to a MIMO mode using a second number of receive paths, which is lower than the first number of receive paths.

According to an embodiment of the invention, the scanning for radio signals in the second mode is accomplished simultaneously with the generation of the data output signal. Accordingly, the second receive path, which is not needed for generating the data output signal in the second mode, may be used for performing the scanning for radio signals.

According to an embodiment of the invention, scanning for radio signals from at least one base station may also be performed in the first mode. This may be accomplished by evaluating both the first and second radio signals and providing a first oscillator signal with first frequencies to the first receive path and a second oscillator signal with second frequencies, which are different from the first frequencies, to the second receive path. In this embodiment, the first and the second receive path can be used in parallel for independent scanning processes. In this way, scanning can be accomplished in an efficient manner. For example, the first receive path may be used for scanning in a first frequency range, while the second receive path is used for scanning in a second frequency range which is different from the first frequency range.

According to an embodiment of the invention, the scanning for radio signals in the first mode may be accomplished during empty slots of a data transmission via the first and second radio signals. The empty slots may be provided by using a compressed mode for the data transmission via the first and second radio signals. By accomplishing the scanning during empty slots of the data transmission, the scanning processes can be implemented without interrupting reception of data via the first and second radio signals.

According to an embodiment of the invention, the first oscillator signal is provided to the first receive path and to the second receive path while generating the data output signal from both the first radio signal and the second radio signal in the first mode. The second oscillator signal is provided to the second receive path while performing the scanning for radio signals in the first mode or in the second mode. Accordingly, the first oscillator signal may be provided to both the first and second receive paths while receiving data in the first mode.

The foregoing and other features and advantages of embodiments of the invention will become further apparent from the following detailed description and the accompanying drawings.

BRIEF DESCRIPTION OF THE DRAWINGS

Embodiments of the present invention are illustrated by the accompanying figures, in which:

FIG. 5 shows a flow chart for schematically illustrating a method according to an embodiment of the invention.

DETAILED DESCRIPTION

Figure 1:
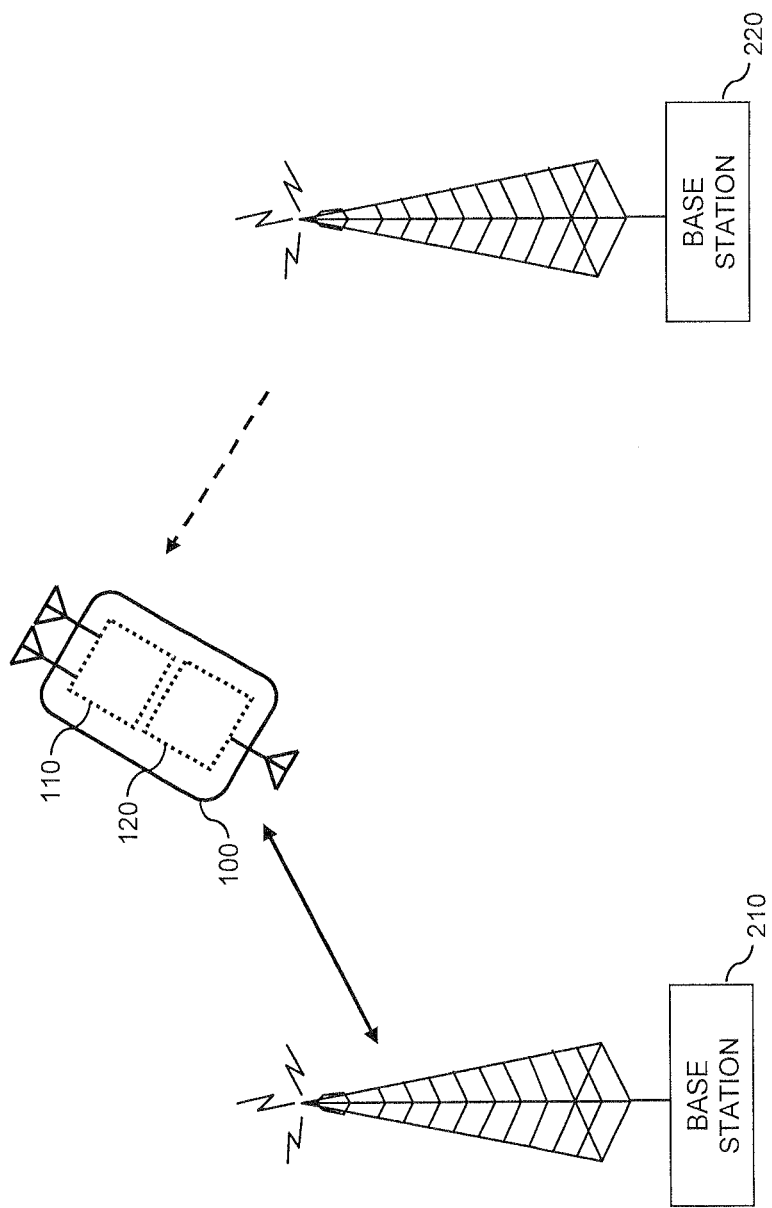
FIG. 1 schematically illustrates a mobile communication network environment with a mobile communication device according to an embodiment of the invention.

In the following, embodiments of the present invention will be described in more detail and with reference to the accompanying drawings. The described embodiments are merely exemplary and not to be construed as limiting the scope of the present invention. It should be noted that in the drawings the elements are not necessary to scale with each other but have been depicted in a manner which allows for conveying features of the illustrated embodiments to a person skilled in the art.

In the following detailed description, embodiments of the present invention are described which relate to a mobile communication device, which may be in the form of a mobile phone, a mobile computer, a handheld media player, a modem stick, or the like. It is to be understood that details of the electronic circuitry and components provided in the mobile communication device will depend on the detailed implementation of the mobile communication device. Accordingly, the mobile communication device may also include components which are not addressed in the following discussion.

FIG. 1 schematically illustrated as mobile communication network environment with a mobile communication device 100 according to an embodiment of the invention. In the following, the mobile communication device 100 will also be referred to as UE. Further, the mobile communication network environment includes a first base station 210 and a second base station 220. Depending on the type of used radio access technology, the base stations may be implemented, e.g., as a Node B of a UMTS network, as an evolved Node B (eNB) of an LTE network, or as a base station of a GSM (Global System for Mobile Communications) network. In the scenario of FIG. 1 it is assumed that the UE 100 is connected via a radio link to the base station 210, which is illustrated by a solid double-headed arrow. For example, there could be an ongoing data session or voice session established via the base station 210 to the UE 100. Further, it is assumed that the UE 100 scans for other base stations and, for this purpose, listens to radio signals from the base station 220, which is illustrated by the dashed arrow. The radio signals transmitted by the base station 210 will typically be on a different frequency than the radio signals transmitted by the base station 220. For receiving the radio signals the UE 100 is provided with a receiver 110, and for transmitting radio signals the UE 100 is provided with a transmitter 120.

In the illustrated embodiment, the receiver 110 of the UE 100 is configured to support MIMO reception of radio signals. For this purpose, the receiver 110 is provided with multiple receive paths for receiving separate radio signals using spatial multiplexing. In the following discussions, it will be assumed that the receiver 110 is provided with two separate receive paths to support 2×2 MIMO reception. However, it is to be understood that also larger MIMO constellations could be supported by providing additional receive paths. For example, 4×4 MIMO reception could be supported by providing the receiver 110 with four receive paths. Further, it is assumed that the receiver 110 may be operated at least in a first mode using all receive paths and a second mode in which at least one of the receive paths is not needed for data reception. For example, the first mode may correspond to a MIMO mode according 3GPP Release 7, 8 or later, and the second mode may correspond to a SISO mode according to 3GPP Release 6 or earlier, e.g., WCDMA according to 3GPP Release 99 to Release 6. The concepts as explained in the following involve that, in the second mode, the at least one receive path not needed for data reception is used for scanning for other base stations, which includes, e.g., evaluating the radio signals transmitted by the second base station 220.

In the following the structure of the receiver 110 will be described in more detail.

Figure 2:
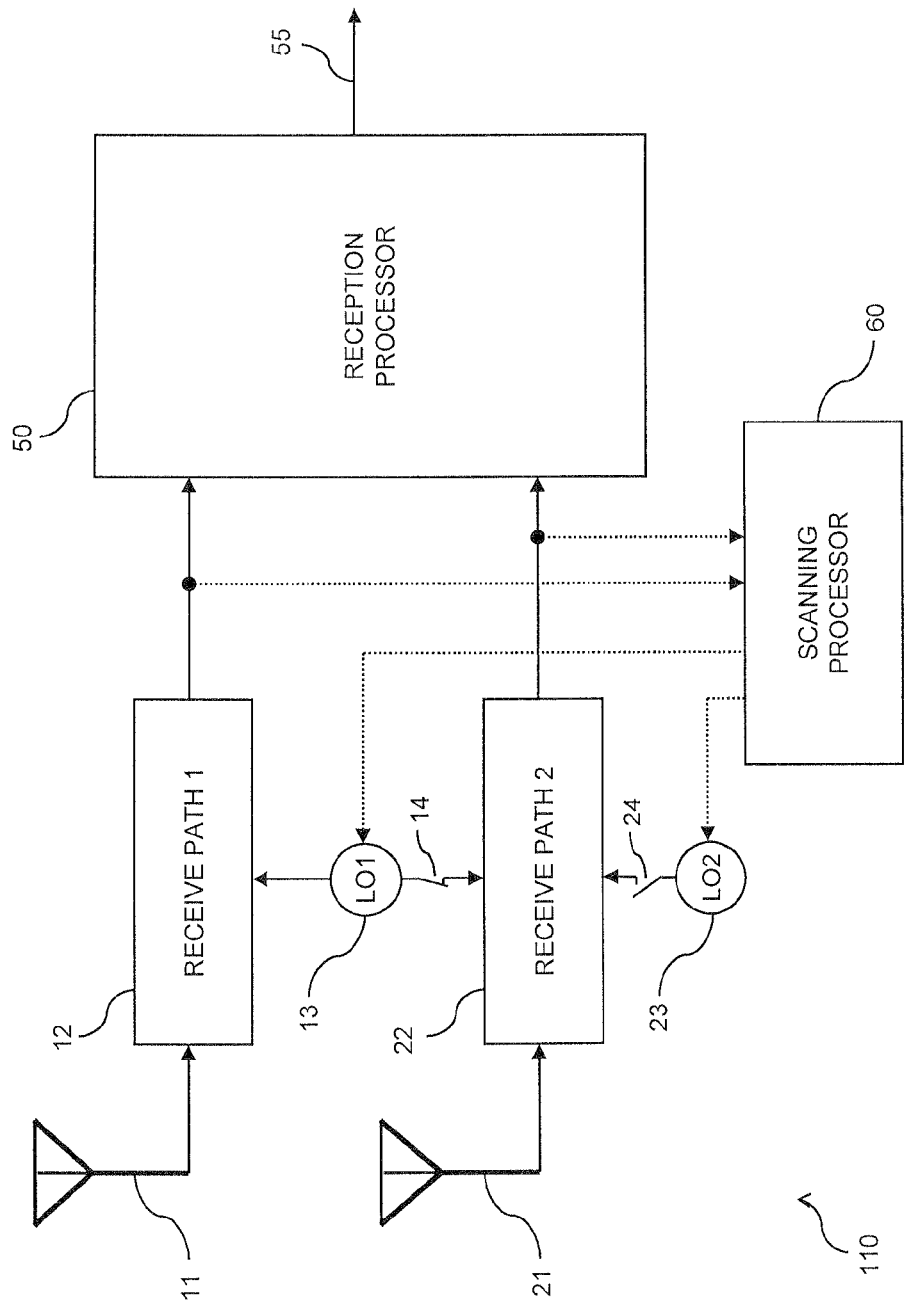
FIG. 2 schematically illustrates a receiver of the communication device in a first mode of operation while receiving data.

FIG. 2 schematically illustrates the receiver 110. As illustrated the receiver 110 includes a first antenna 11 coupled to a first receive path 12 and a second antenna 21 coupled to a second receive path 22. The first receive path 12 processes first radio signals received via the first antenna 11, and the second receive path 22 processes second radio signals received via the second antenna 21. The first and second receive paths 12, 22 may each be equipped with a number of components for processing the received radio signals. These components may include, e.g., an analog front end with a demodulator, an analog-to-digital converter, a digital front end, and/or a fast Fourier transform (FFT) block. The receiver 110 is provided with a first local oscillator 13 for providing an oscillator signal to the first receive path 12 and a second local oscillator 23 for providing an oscillator signal to the second receive path 22. More specifically, the first oscillator signal may be used for demodulation of the first radio signals and be supplied to a demodulator of the first receive path 12. Similarly, the second oscillator signal may be used for demodulation of the second radio signals and be supplied to a demodulator of the second receive path 22.

As further illustrated, the receiver 110 is provided with a first switch 14 and a second switch 24. The first switch 14 is coupled between the first local oscillator 13 and the second receive path 22, and the second switch 24 is coupled between the second local oscillator 23 and the second receive path 22. Accordingly, the first and second switches 14, 24 can be used for selectively providing either the first oscillator signal or the second oscillator signal to the second receive path 22. More specifically, by closing the first switch 14 and opening the second switch 24 the first oscillator signal can be provided to the second receive path 22, and by opening the first switch 14 and closing the second switch 24 the second oscillator signal can be provided to the second receive path 22.

Further, the receiver 110 is provided with a reception processor 50. The reception processor 50 is configured to generate a data output signal 55 from the first and second radio signals. More specifically, in the first mode the reception processor 50 generates the data output signal 55 on the basis of both the first radio signal and the second radio signal, e.g., by applying MIMO processing to the first and second radio signals. In the second mode the reception processor 50 generates the data output signal 55 independently from the first radio signal, e.g., by applying SISO processing to the first radio signal only. The reception processor 50 may be configured to subject the received first and/or second radio signals to processing such as MIMO detection, de-interleaving, soft combining, concatenation, rate matching, decoding, error correction, or the like.

Further, the receiver 110 is provided with a scanning processor 60. The scanning processor 60 is coupled at least to the second receive path 22 and to the second oscillator 23. In the illustrated implementation, the scanning processor 60 is also coupled to the first receive path 12 and to the first oscillator 13. The scanning processor 60 performs scanning for radio signals from base stations, e.g., the base stations 210, 220 of FIG. 1, by evaluating the second radio signals received via the second receive path. For this purpose, the frequency of the second oscillator signal is controlled by the scanning processor 60 to different values, which may in particular be different from the frequency of the first oscillator signal. In the first mode, also the first radio signals received via the first receive path 13 may be evaluated by the scanning processor 60. In this case both the frequency of the first oscillator signal and the frequency of the second oscillator signal may be controlled to different values by the scanning processor 60.

Figure 3:
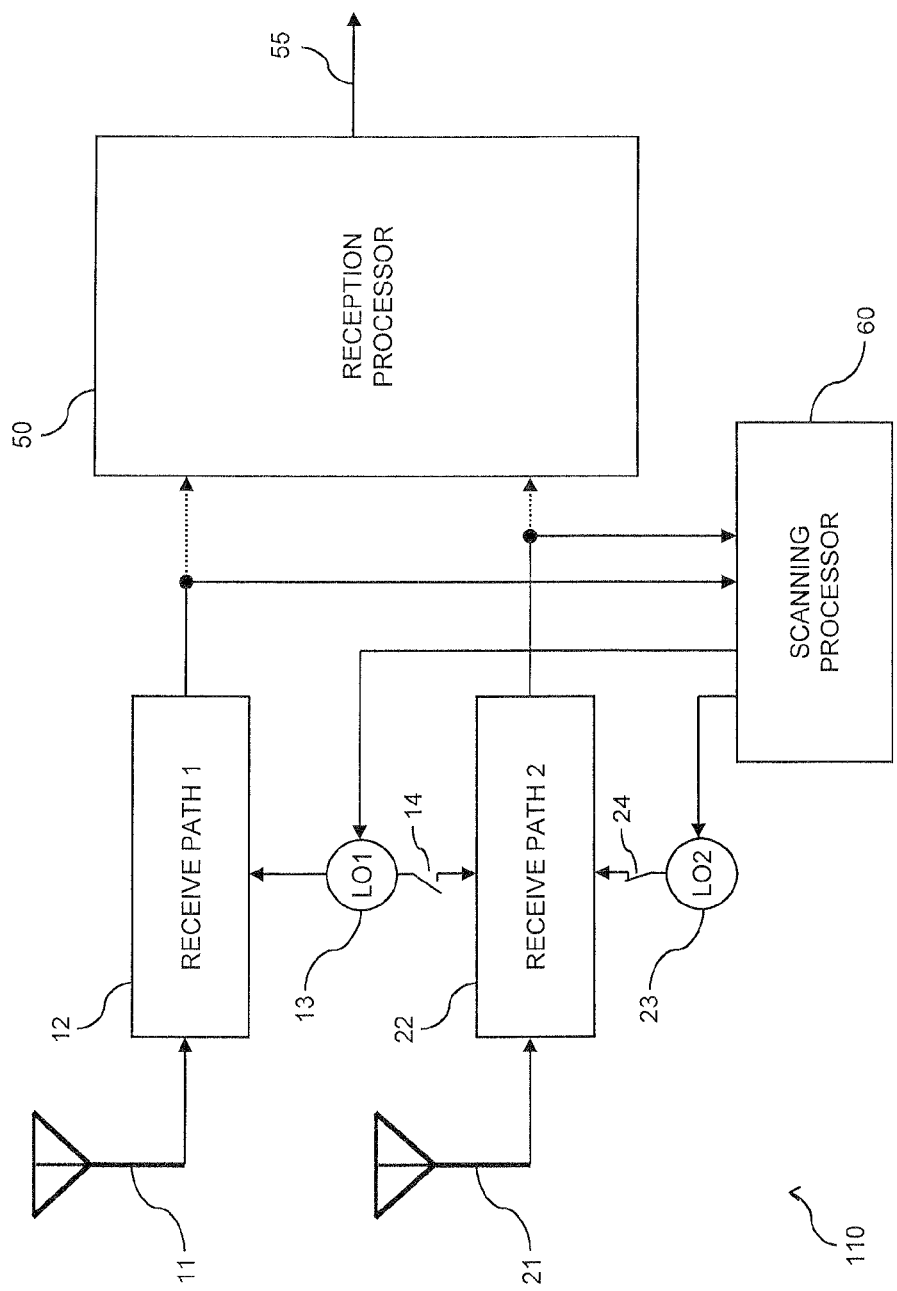
FIG. 3 schematically illustrates the receiver in the first mode of operation while scanning for base stations.
Figure 4:
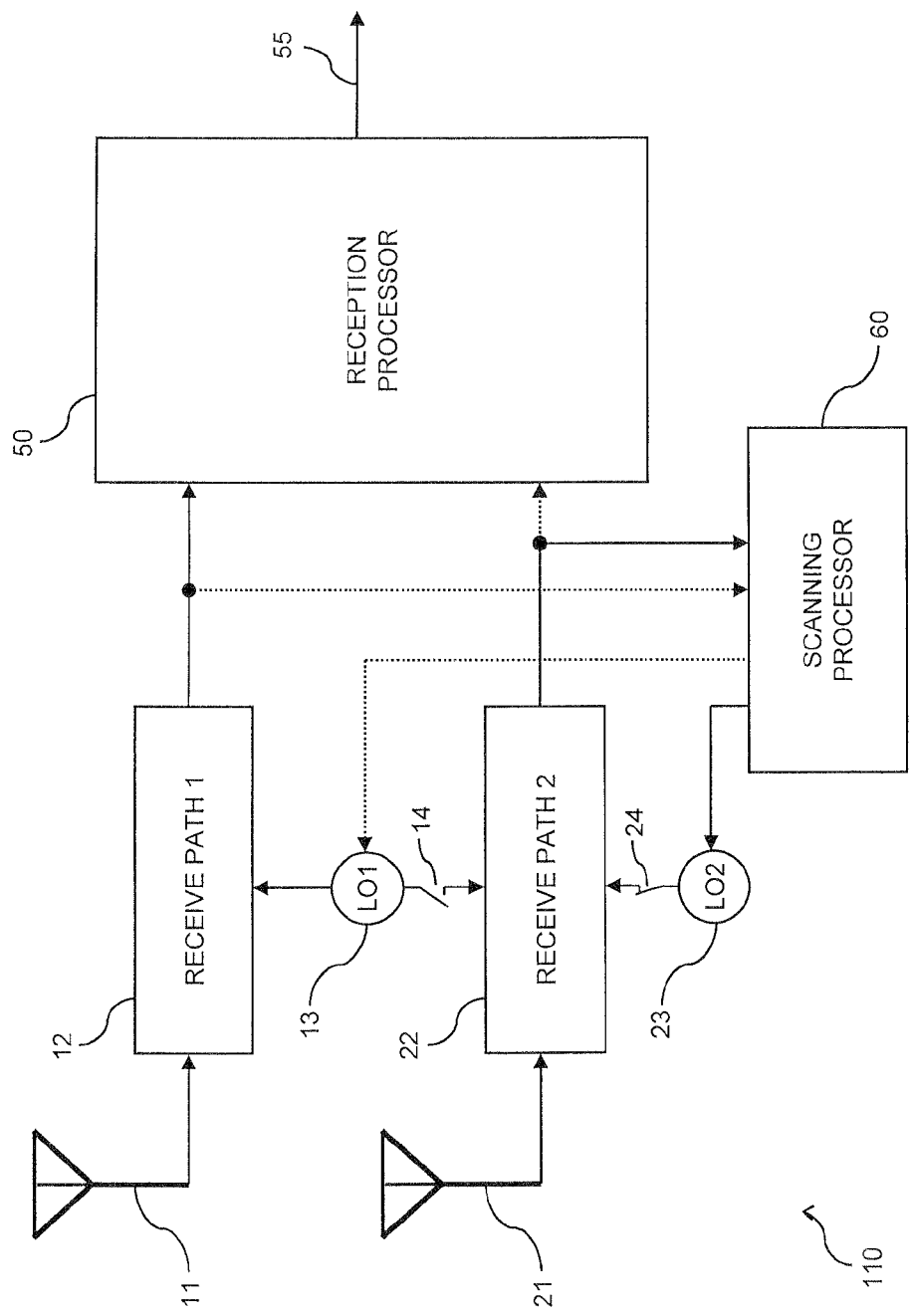
FIG. 4 schematically illustrates the receiver in a second mode of operation.

Operations of the receiver 110 in the first and second modes will now be further explained in connection with FIGS. 2-4. In FIGS. 2-4, structures which are active in the respective illustrated mode and operation are illustrated by solid lines, whereas structures which are not used or inactive are illustrated by dotted lines.

FIG. 2 illustrates the receiver 110 while receiving data in the first mode. The data may relate to an ongoing data session or voice session. As illustrated, the reception processor 50 generates the data output signal 55 on the basis of both the first radio signals received by the first receive path 12 and the second radio signals received by the second receive path 22. In the illustrated implementation this is accomplished by applying MIMO processing to the first and second radio signals. Accordingly, both the first receive path 12 and the second receive path 22 are used for receiving data. As can be seen from the dotted lines, the scanning processor 60 is not active while receiving data in the first mode. Further, it can be seen that while receiving data in the first mode the first switch 14 is closed whereas the second switch 24 is open. Accordingly, the first oscillator signal generated by the first local oscillator is provided to both the first receive path 12 and the second receive path 22, e.g., to be used for demodulation of the respective received radio signals. By using the same oscillator signal in both the first and the second receive paths 12, 22, synchronization of independent oscillator signals between the first and second receive paths 12, 22 can be avoided.

FIG. 3 illustrates the receiver 110 while scanning for base stations in the first mode. As can be seen, while scanning for base stations in the first mode the first switch 14 is open whereas the second switch 24 is closed. Accordingly, the first oscillator signal generated by the first local oscillator 13 is provided to the first receive path 12 and the second oscillator signal generated by the second local oscillator 23 is provided to the second receive path 22, e.g., to be used for demodulation of the respective received radio signals. The frequency of the first oscillator signal and of the frequency of the second oscillator signal are controlled by the scanning processor 60. As further illustrated, the scanning processor 50 evaluates the first radio signals received by the first receive path 12 and the second radio signals received by the second receive path 22 while controlling the frequency of the first oscillator signal to different values and controlling the frequency of the second oscillator signal to different values. Since the first and second oscillator signals are generated by separate oscillators, i.e., by the first local oscillator 13 and the second local oscillator 23, respectively, the first oscillator signal can be controlled to first frequencies, e.g., in a first frequency range or band, and the second oscillator signal can be simultaneously controlled to second frequencies which are different from the first frequencies, e.g., in a second frequency range or band. In this way, both the first and the second receive path 12, 22 can be used in an efficient manner for scanning different frequencies.

The scanning operation as illustrated in FIG. 3 may be accomplished during empty slots of the data transmission via the first and second radio signals as explained in connection with FIG. 2. The empty slots, also referred to as transmission gaps, may be generated by using a compressed mode for the data transmission, e.g., as explained in 3GPP TS 25.212. Due to the efficient usage of both the first and the second receive path 12, 22 for scanning different frequencies, the number and/or duration of empty slots needed for performing the scanning is limited.

FIG. 4 illustrates the receiver 110 while receiving data and scanning for base stations in the second mode. In this case, reception of data and scanning for base stations is accomplished simultaneously. That is to say, the reception processor 50 generates the data output signal 55 independently from the second radio signals received by the second receive path 22, and the scanning processor 60 may therefore at the same time use the second receive path 22 for performing the scanning. In the illustrated implementation generation of the data output signal is accomplished by applying SISO processing to the first radio signals. Accordingly, only the first receive path 12 is used for receiving data.

As can be seen, while scanning for base stations in the second mode the first switch 14 is open whereas the second switch 24 is closed. Accordingly, the first oscillator signal generated by the first local oscillator 13 is provided to the first receive path 12 and the second oscillator signal generated by the second local oscillator 23 is provided to the second receive path 22, e.g., to be used for demodulation of the respective received radio signals. The frequency of the second oscillator signal is controlled by the scanning processor 60. As further illustrated, the scanning processor 50 evaluates the second radio signals received by the second receive path 22 while controlling the frequency of the second oscillator signal to different values.

This does not affect the first oscillator signal provided to the first receive path 12, and therefore an ongoing data transmission via the first radio signals received by the first receive path 12 is not disturbed. In particular, the first local oscillator 13 may provide the first oscillator signal with a frequency as needed for receiving the data, while the scanning processor 60 controls the second oscillator signal to other frequencies so as to listen for radio signals from other base stations. Further, no empty slots need to be provided in the data transmission, which allows for avoiding usage of a compressed mode for the data transmission. This, in turn, allows for reducing load on the network and/or increasing the performance of data transmission.

FIG. 5 shows a flowchart for schematically illustrating a method of receiving data according to an embodiment of the invention. The method is performed in a communication device, e.g., the communication device 100 including the receiver 110. The communication device is provided with at least two modes of receiving data, i.e., at least a first mode in which data reception is accomplished via multiple receive paths, e.g., MIMO reception, and a second mode in which at least one of the multiple receive paths is not needed, e.g., SISO reception or MIMO reception using a smaller MIMO constellation than in the first mode. For example, the first mode may correspond to a MIMO mode according 3GPP Release 7, 8 or later, and the second mode may correspond to a SISO mode according to 3GPP Release 6 or earlier, e.g., WCDMA according to 3GPP Release 99 to Release 6.

At step 510, first radio signals are received in a first receive path, e.g., in the first receive path 12 of the receiver 110. The first radio signals may be received from a base station, e.g., the base station 210 or 220 of FIG. 1.

At step 520, second radio signals are received in a second receive path, e.g., in the second receive path 22 of the receiver 110. The second radio signals may be received from a base station, e.g., the base station 210 or 220 of FIG. 1. The second radio signals may be received from the same base station as the first radio signals or from a different base station than the first radio signals. In the second mode of the communication device, the second receive path is not needed for receiving data.

At step 530, it is determined whether the communication device is in the second mode. If the communication device is not in the second mode, but in the first mode, as indicated by branch "N", the method continues with step 540. I the communication device is in the second mode, as indicated by branch "Y", the method continues with step 560.

At step 540, data reception is performed according to the first mode by generating a data output signal from both the first and the second received radio signals.

At step 550, the communication device scans for radio signals by evaluating both the first and the second radio signals and providing the first and second receive paths with oscillator signals of different frequencies. In particular, the first receive path may be provided with a first oscillator signal having first frequencies, and the second receive path may be provided with a second oscillator signal having second frequencies which are different from the first frequencies. For example, the first frequencies may be from a first frequency range, and the second frequencies may be from a second frequency range which is different from the first frequency range. In this way, scanning can be efficiently performed by utilizing both the first receive path and the second receive path for simultaneously evaluating different frequencies. The first oscillator signal may be generated by a first oscillator, e.g., the first local oscillator 13, and the second oscillator signal may be generated by a second oscillator, e.g., the second local oscillator 23. The scanning of step 550 may be performed during empty slots of an ongoing data transmission via the first and second radio signals. The scanning of step 550 may be performed by a scanning processor of the communication device, e.g., the scanning processor 60.

At step 560, data reception is performed according to the second mode by generating the data output signal independently from the second received radio signals.

At step 570, the communication device scans for radio signals by evaluating the second radio signals and providing the second receive path with an oscillator signal of different frequencies, which are different from a frequency of an oscillator signal provided to the first receive path. In particular, the first receive path may be provided with a first oscillator signal having a first frequency as needed for receiving data, and the second receive path may be provided with a second oscillator signal having second frequencies which are different from the first frequency. In this way, scanning can be efficiently performed by utilizing the first receive path for receiving data and simultaneously utilizing the second receive path for performing the scanning, i.e., steps 560 and 570 may be performed simultaneously. During steps 560 and 570, the first oscillator signal may be generated by a first oscillator, e.g., the first local oscillator 13, and the second oscillator signal may be generated by a second oscillator, e.g., the second local oscillator 23. The scanning of step 570 may be performed without requiring empty slots of an ongoing data transmission via the first radio signals. The scanning of step 570 may be performed by a scanning processor of the communication device, e.g., the scanning processor 60.

It is to be understood that the method steps of FIG. 5 may be performed in any appropriate order, which may deviate from the order as illustrated in FIG. 5. Also, it is to be understood that at least some of the method steps may be executed in a repetitive manner, e.g., so as to accomplish scanning at regular time intervals.

It is to be understood that the embodiments and examples as described above have been provided for the purpose of illustrating the general concepts of the present invention and are susceptible to various modifications. For example, the concepts may be applied in various types of mobile communication devices. Also, the concepts may be extended to larger numbers of receive paths and in connection with various types of diversity reception. Moreover, it is to be understood that the above-described concepts could be implemented by dedicated hardware or by software to be executed by a processor of a suitably equipped mobile communication device.

The invention claimed is:

1. A mobile communication device, comprising:
a first receive path configured to receive first radio signals;
a second receive path configured to receive second radio signals;
a reception processor configured to process the first radio signals and the second radio signals;
a first oscillator configured to supply a first oscillator signal to the first receive path;
a second oscillator configured to supply a second oscillator signal to the second receive path; and
a scanning processor coupled at least to the second receive path and to the second oscillator,
wherein the scanning processor is configured to scan for radio signals from at least one base station by evaluating the second radio signals received by the second receive path and controlling the second oscillator to provide the second oscillator signal with frequencies which are different from a frequency of the first oscillator signal.

2. The communication device according to claim 1, wherein the reception processor is provided with a first mode in which a data output signal of the reception processor is generated on the basis of both the first radio signal and the second radio signal.

3. The communication device according to claim 2, wherein the reception processor is configured to apply Multiple-Input and Multiple-Output processing to generate the data output signal from the first radio signal and the second radio signal.

4. The communication device according to claim 2, wherein the reception processor is provided with a second mode in which the data output signal of the reception processor is generated independently from the second radio signal.

5. The communication device according to claim 4, wherein the scanning processor is configured to accomplish said scanning for radio signals simultaneously with the generation of the data output signal while the reception processor is in the second mode.

6. The communication device according to claim 1, wherein the scanning processor is further coupled to the first receive path and to the first oscillator, and
wherein the scanning processor is configured to scan for radio signals from at least one base station by evaluating both the first radio and second radio signals and controlling the first oscillator and the second oscillator to provide the first oscillator signal with first frequencies and the second oscillator signal with second frequencies, which are different from the first frequencies.

7. The communication device according to claim 1, wherein the scanning processor is configured to accomplish said scanning for radio signals during empty slots of a data transmission via the first and second radio signals.

8. The communication device according to claim 1, comprising:
a first switch for selectively providing the first oscillator signal to the second receive path; and
a second switch for selectively providing the second oscillator signal to the second receive path.

9. The communication device according to claim 1, comprising:
a first antenna coupled to the first receive path; and
a second antenna coupled to the second receive path.

10. A method of receiving data in a mobile communication device, comprising:
receiving first radio signals in a first receive path;
receiving second radio signals in a second receive path;
in a first mode, generating a data output signal on the basis of the received first radio signals and the received second radio signals;
in a second mode, generating the data output signal independently from the received second radio signals; and
in the second mode, scanning for radio signals from at least one base station by evaluating the received radio signals of the second receive path and providing the second receive path with a second oscillator signal having frequencies which are different from a frequency of a first oscillator signal provided to the first receive path.

11. The method according to claim 10, wherein the data output signal is generated from the first radio signal and the second radio signal by applying Multiple-Input and Multiple-Output processing.

12. The method according to claim 10,
wherein said scanning for radio signals in the second mode is accomplished simultaneously with the generation of the data output signal.

13. The method according to claim 10, comprising:
in the first mode, scanning for radio signals from at least one base station by evaluating both the first radio and second radio signals and providing the first oscillator signal with first frequencies to the first receive path and the second oscillator signal with second frequencies, which are different from the first frequencies, to the second receive path.

14. The method according to claim 13,
wherein said scanning for radio signals in the first mode is accomplished during empty slots of a data transmission via the first and second radio signals.

15. The method according to claim 10, comprising:
in the first mode, providing the first oscillator signal to the first receive path and to the second receive path while generating the data output signal from both the first radio signal and the second radio signal; and
in the second mode, providing the second oscillator signal to the second receive path while performing said scanning for radio signals.

* * * * *